(No Model.) 5 Sheets—Sheet 2.
E. F. STECK.
CHEMICAL FIRE EXTINGUISHER.
No. 327,342. Patented Sept. 29, 1885.

Fig. 2.

Witnesses
Inventor
Ernest F. Steck (No Model.) 5 Sheets—Sheet 3.

E. F. STECK.
CHEMICAL FIRE EXTINGUISHER.

No. 327,342. Patented Sept. 29, 1885.

(No Model.) 5 Sheets—Sheet 4.
E. F. STECK.
CHEMICAL FIRE EXTINGUISHER.
No. 327,342. Patented Sept. 29, 1885.

Witnesses
Will R. Onschundro
Chas. G. Page Inventor
Ernst F. Steck
By Jno. G. Elliott
Atty.

(No Model.) 5 Sheets—Sheet 5.

E. F. STECK.
CHEMICAL FIRE EXTINGUISHER.

No. 327,342. Patented Sept. 29, 1885.

Witnesses.
Will C. Onohundro.
Chas. G. Page.

Inventor.
Ernst F. Steck.
By Jno. G. Elliott
Atty.

UNITED STATES PATENT OFFICE.

ERNST F. STECK, OF CHICAGO, ILLINOIS.

CHEMICAL FIRE-EXTINGUISHER.

SPECIFICATION forming part of Letters Patent No. 327,342, dated September 29, 1885.

Application filed May 9, 1884. (No model.)

*To all whom it may concern:*

Be it known that I, ERNST F. STECK, a citizen of the United States, residing in Chicago, county of Cook, and State of Illinois, have invented certain new and useful Improvements in Chemical Fire-Extinguishers, of which the following is a specification.

This invention, while relating generally to chemical fire-extinguishers in which an acid-vessel containing an acid is confined within a cylinder containing some alkaline solution, and means are provided for allowing the acid and the alkali to mix and thereby generate pressure at a time when it is desired to render the extinguisher available, has more particular relation to fire-extinguishers of that class in which a wheeled carriage is provided with one or more cylinders in which the mixing is attained by inversion of the cylinder or cylinders, so as to open the valve-stoppers of an acid-vessel confined within the cylinder containing an alkali.

Heretofore the most approved construction of fire-extinguisher of the class referred to has been that in which one or more tilting or oscillating cylinders or extinguishers are supported by hollow trunnions upon the carriage-frame, and normally maintained in a vertical position by a latching or locking mechanism, while the acid-vessels are held in casings upon a step or platform at the rear of the carriage until it is desired to bring the extinguisher into action, at which time it becomes the duty of an attendant to place and secure the acid-vessel within the top end of a cylinder and to then invert the latter, which action will necessarily cause a simultaneous inversion of the acid-vessel, and hence allow the valve-stopper of the acid-vessel to open by gravity, and thereby permit the acid and the alkali to mix. In an apparatus of such construction the hose-reel has also been mounted in an elevated position at a point between the forward upright cylinder, where two are employed, and the driver's seat, from which said seat it is necessary to unreel the hose at a time when the extinguisher is to be called into action. The cylinders of a double-cylinder fire-extinguishing apparatus of such character have necessarily been of a considerable height in order to provide an extinguisher of a serviceable capacity, and owing to their height serve to render the apparatus top-heavy, and thereby liable to tip over in turning sharp corners or running over rough roads, and as two tilting cylinders are usually trunnioned upon one carriage in a position the one in advance of the other, the carriage must necessarily be of a considerable length in order to admit of the required oscillation on the part of the cylinders at such times as they require inversion, it being evident that a pair of oscillatory cylinders will under such arrangement necessitate a working-space in the frame fully as long as the combined lengths of the two cylinders.

It is also necessary in an apparatus of serviceable size of the above construction to provide means whereby an attendant can climb upon the top of the carriage, so as to fit the acid-vessels within the top ends of the cylinders before inverting the latter, and it has also been the duty of another attendant to mount the carriage by some suitable ladder in order to unreel the hose.

It is the object of this invention to avoid the feature of top-heaviness pertaining to a fire-extinguisher of the character hereinbefore referred to, and to further simplify and lessen the dimension, and cost of construction of the frame or carriage on which the cylinders are supported, to render the entire apparatus more available and more compact, and at the same time of an equal capacity to those in which a pair of upright cylinders are trunnioned upon one frame or carriage; to altogether dispense with the necessity of one or more attendants climbing upon the carriage in order to have access to the reel and the top ends of the cylinders, and to provide an arrangement whereby both the reels and the openings in the cylinders in which the acid-vessels are introduced shall at all times be within reach of an attendant while standing upon the step or platform at the rear end of the carriage.

Figure 1:
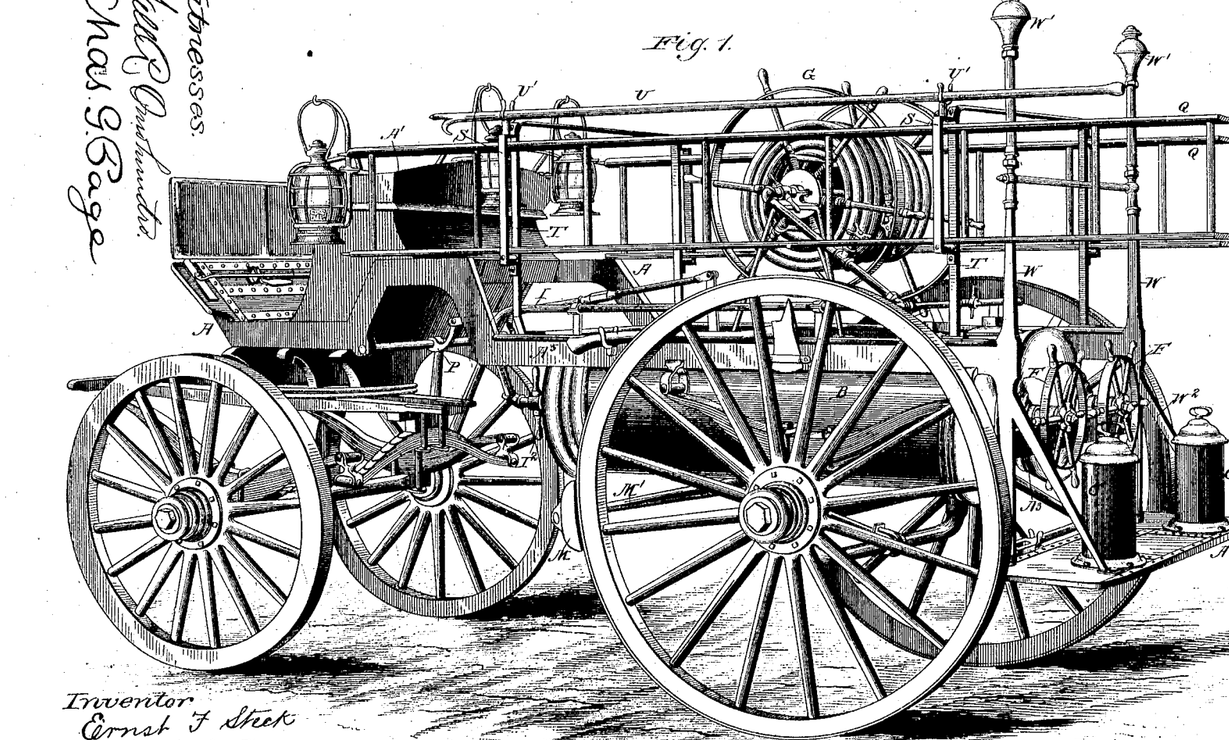
Figure 2:
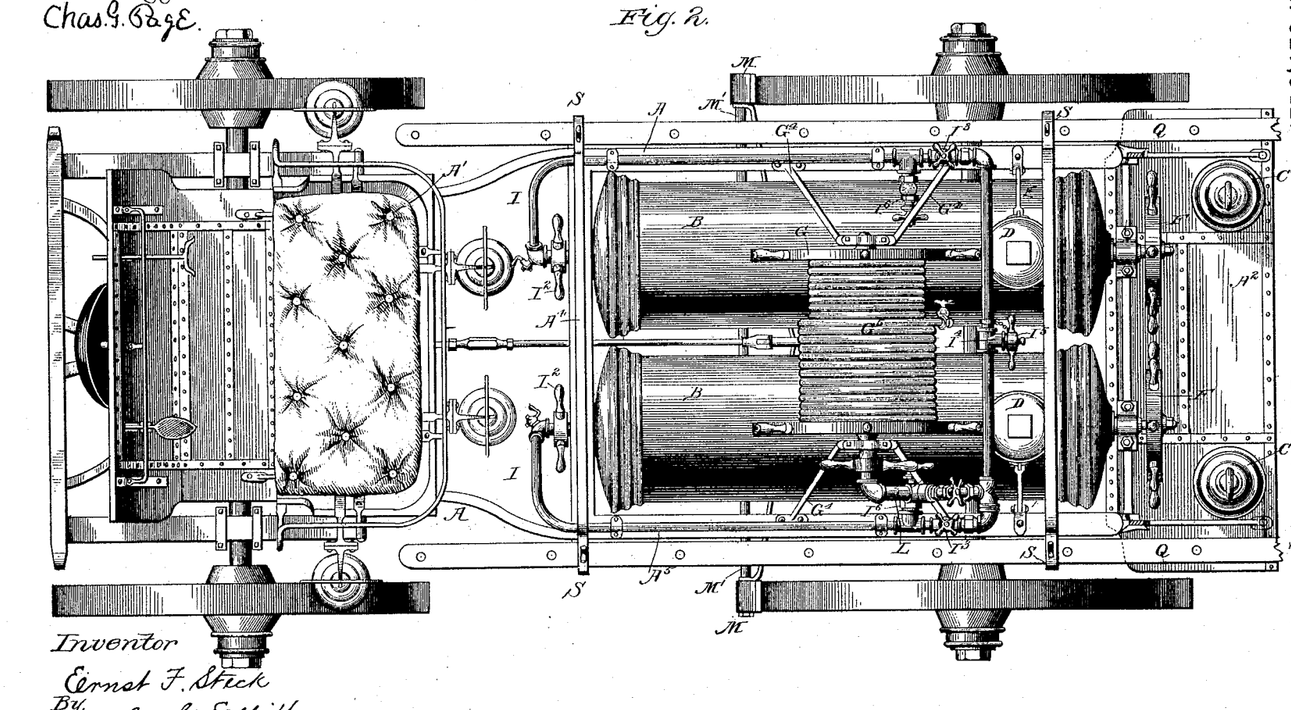
Figure 3:
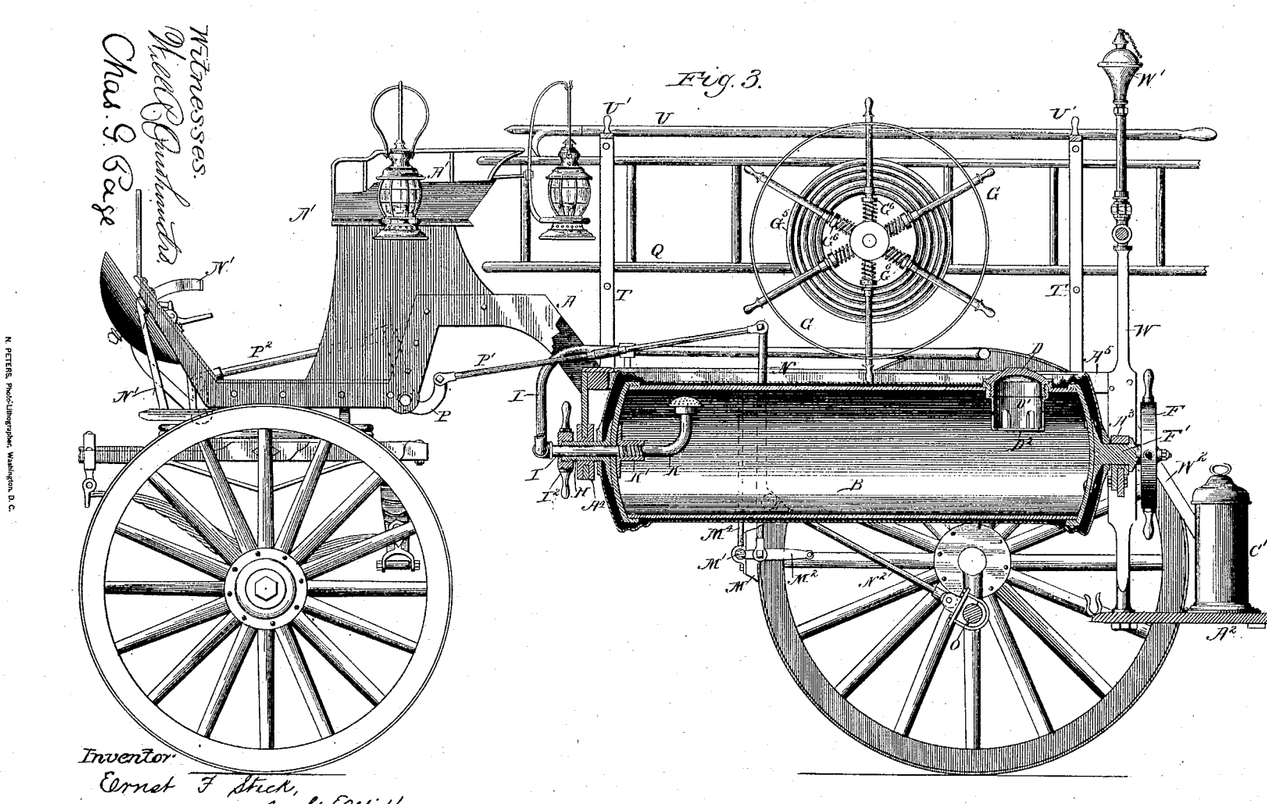
Figure 4:
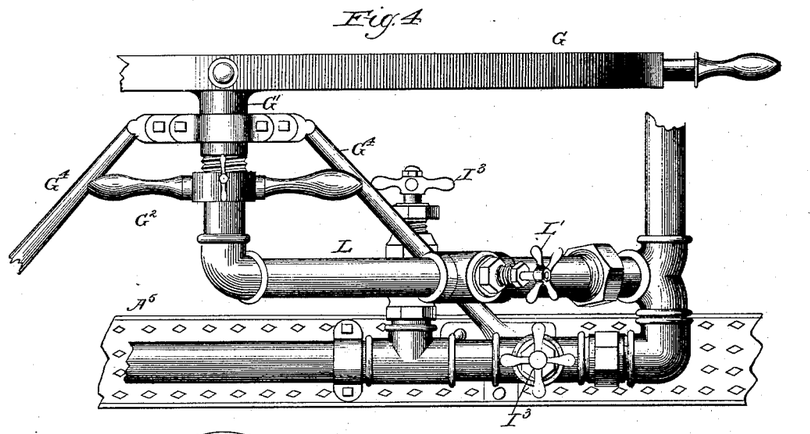
Figure 5:
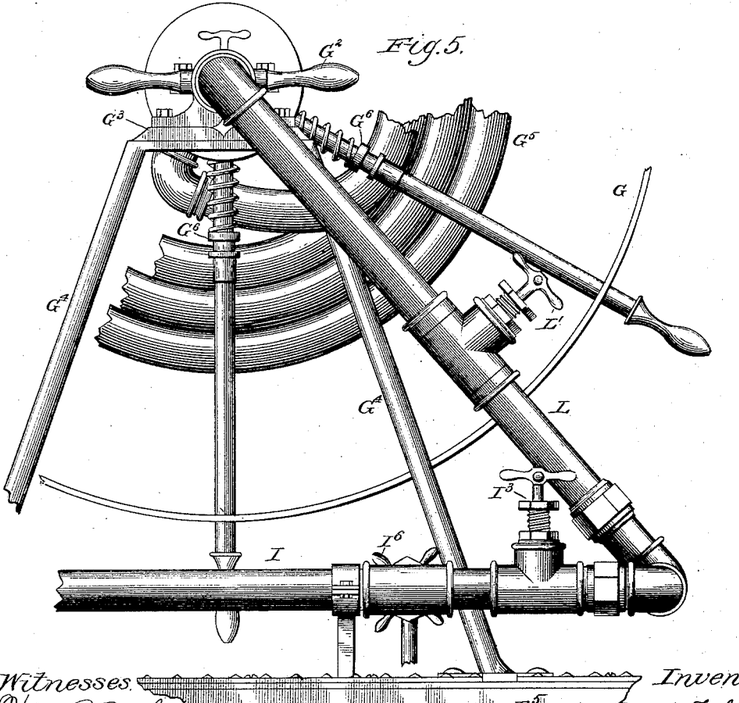
Figures 6, 7, 8, 9, 10, 11, 12, 13:
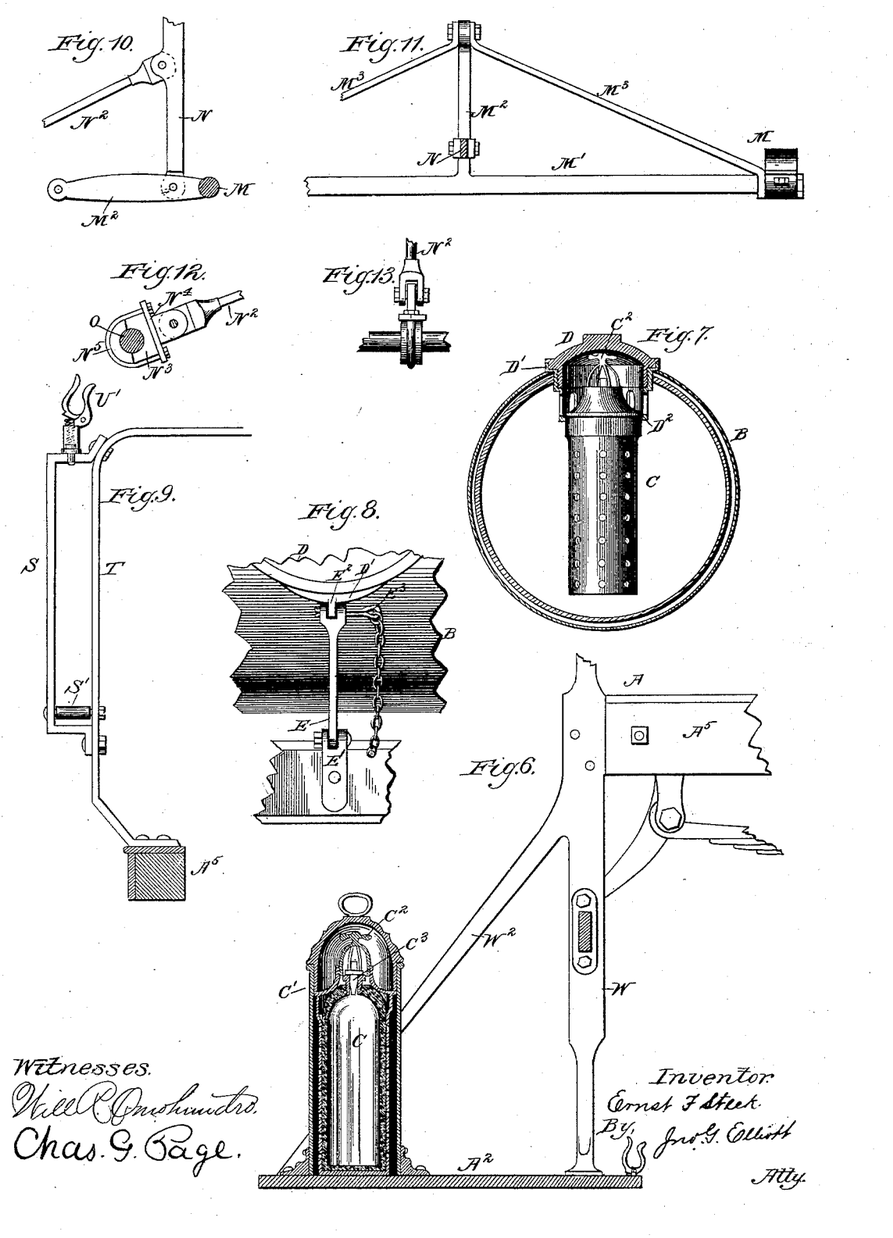

To such end, in place of the upright tilting cylinders trunnioned upon a frame or carriage and arranged to tilt in a vertical plane, I provide one or more horizontally-mounted cylinders, susceptible of oscillating about their axes and connected at one end with a hose-pipe through the medium of a suitable connection, which said cylinder or cylinders is or are adapted to receive and support the acid vessel or vessels in such position that when a partial rotation is given to a cylinder containing an acid-vessel the valve-stopper of the latter shall open, so as to allow the chemicals to mix in the cylinder. Under such arrangement a wheeled carriage can be provided with a pair of horizontal cylinders arranged side by side and provided with hand-holes or openings at points near their rear ends and within reach of an attendant standing upon a low-down step at the rear of the carriage; also, by this arrangement, owing to the absence of trunnions at the sides of the cylinders, the width of the apparatus will not be objectionably increased, and at the same time the body-frame of the carriage can be made nearly one-half the length of a carriage where two upright tilting cylinders are employed, the one in advance of the other. This construction also admits of the hose reel being supported over the horizontal cylinder or cylinders, as the case may be, at a point where it can be readily reached by an attendant standing upon the step at the rear of the carriage, which will, therefore, obviate the necessity of an attendant climbing upon the carriage-frame as heretofore.
A further object is to provide a simple, convenient, and effective arrangement of pipe-connection and cocks between the cylinder and the hose-reel, whereby communication between the hollow axle of a hose-reel to which the hose is attached and the hollow end journals or bearings of the cylinders mounted side by side can be established or cut off, so that the cylinders can be simultaneously or alternately opened or closed, and also whereby one cylinder can be opened for blowing off, while communication between the same and the hollow hose-reel or hose and the remaining cylinder can be cut off, and communication between the latter and the hose-pipe be either cut off or established.
 A further object is to provide simple and efficient means for forming a tight joint at the points of connection between the pipes and the cylinders, and also between the pipe or pipes and the hollow axle of the reel, which said joint can be tightened up without the use of a wrench or other like instrument.
 Further objects are to provide certain improved features of construction and combination, all as hereinafter described, claimed, and illustrated in the annexed drawings, in which—
 Figure 1 is a perspective view of a double-cylinder fire-extinguisher embodying the features of my invention. Fig. 2 is a top or plan view of the same. Fig. 3 represents the apparatus, partly in side elevation and partly in sectional elevation, taken on a vertical plane passing through one of the cylinders. Fig. 4 is a top or plan detail view illustrating a pipe-connection with the hollow axle of the reel, said view illustrating portions of the pipe-connection at one side of the apparatus. Fig. 5 is a detail representing in side elevation that portion of the apparatus which is embraced in the preceding figure. Fig. 6 is a detail, partly in side elevation and partly in sectional elevation, illustrating an acid tank or vessel seated within a casing upon the rear end step of the carriage, and further showing the supports for the said step or platform. Fig. 7 represents a section taken transversely through one of the cylinders at a point near the end thereof, and illustrates an acid vessel suspended and confined within the cylinder. Fig. 8 is a top or plan detail view illustrating means by which a cylinder can be held against rotation in order to prevent its contents from accidentally spilling. Fig. 9 is a detail view illustrating one of the supports by which the hook and the ladder are conveniently supported at one side of the carriage. Fig. 10 is a detail showing in side elevation a portion of the brake mechanism. Fig. 11 is a top or plan view of the principal portion of the brake. Fig. 12 is a detail side view illustrating the lower portion of a rod connecting the brake-lever with the axle, and shows the connection between said rod and the axle. Fig. 13 is a plan view looking down on the same.
 Referring by letter to the several figures of the drawings, in which like letters denote like parts, A designates the body-frame of a four-wheeled spring-carriage, which is provided at its forward end with an elevated driver's seat, A', and at its rear end with a low-down step or platform, A², for an attendant to stand upon.
 The two cylinders B of this apparatus are arranged longitudinally and in a horizontal position within a rectangular portion of the body-frame, and are mounted at their ends so as to lie side by side and parallel with each other. Under this arrangement the driver's seat can be located at a point not far in advance of the forward ends of the cylinders, thus materially shortening the length of the carriage, which cylinders extend back to points over or nearly over the forward portion of the low-down step or platform located at the rear of the carriage, whereby the rear ends of the cylinders are readily accessible to an attendant standing upon said step.
 The acid-vessels C, prior to bringing the apparatus into action, will be confined within suitable casings, C', supported upon the low-down step at the rear of the carriage; and at a time when it is desired to charge the cylinders by allowing the chemicals to mix the acid-vessels can be removed from their casings by an attendant standing upon the rear step, who, while without leaving his position thereon can introduce the acid-vessels into the cylinders through openings formed through the sides of the cylinders at points near the rear ends of the latter.
The acid-vessels are each provided with a suitable handle, C², by which the vessel can be conveniently lifted, and with a gravity valve-stopper, C³, by which the vessel is closed while it is in its normal upright position, as illustrated in Figs. 6 and 7.

The opening in a cylinder is closed, prior to the introduction of the acid-vessel therein, by a screw-cap, D, screwed into a perforated shell, D', which fits in the opening in the cylinder and extends into the latter, and provides a seating for the cap, and also for the acid-vessel when the latter is introduced within the cylinder.

To introduce an acid-vessel, the cap is removed and the acid-vessel passed down through the seating until a shoulder near the top end of the acid-vessel rests upon a ledge or flange, $D^2$, at the inner end of the seating, after which the cylinder can be closed by replacing and screwing down the cap D. The acid-vessel thus introduced is held at right angles to the axis of the cylinder, and stands in an upright position, with its neck or stopper end uppermost, so long as the cylinder is in position to be locked or held against rotation by a locking device, one of which is provided for each cylinder.

The construction of locking device herein shown is that of an arm, E, pivoted at one end to a small bearing, E', secured upon a side of the body-frame, and at its opposite end adapted to be engaged with the cylinder or some member rigid therewith—as, for example, the arm can at this end be engaged with an eye, $E^2$, upon the outer end of seating D', by means of a pin, $E^3$, connected by a chain with the body-frame and passing through the eye on the seating, and a pair of eyes formed at the free end of the pivoted arm.

By withdrawing the pin the cylinder can be unlocked, and a partial rotation given to the cylinder, so as to invert the acid-vessel and allow its stopper to drop and open the same, in which way communication is established between the acid-vessel and the cylinder through the medium of perforations or openings $D^2$ in the seating, and hence the chemicals allowed to mix.

The cylinders herein shown are turned from their rear ends by means of hand-wheels F, arranged over the rear step, these hand-wheels being secured upon journals F', which are provided for the rear ends of the cylinders and mounted upon a cross-bar, $A^3$, at the rear end of the body-frame.

The hose-reel G, carrying a suitable length of hose-pipe, is arranged above the horizontal cylinders and at a point where the pipe can be reached and unwound from the reel by an attendant standing upon the low-down step at the rear end of the carriage.

The hose-pipe is connected with the cylinders through the medium of a system of pipe-connection and cocks, as follows: Each cylinder is provided at one end with a hollow journal, H, mounted in a transverse bar, $A^4$, of the body-frame of the carriage. A short horizontal end section of a fixed pipe, I, enters each hollow journal from the outer end of the latter and meets within the said journal the forward end of a pipe, K, which extends back into the cylinder, and is bent laterally within the same, so that its inner or rear end, provided with a perforated rose or strainer, shall terminate at a point near the inner wall of the cylinder. The end sections of pipe I are held stationary and in rigid connection with upwardly-bent sections of the pipe by means of a suitable joint or couplings, while each pipe K is held in connection with a cylinder, so as to turn simultaneously with the partial rotation given to the latter, either for the purpose of inverting the acid-vessel or for subsequently righting the same in order to allow it to be conveniently lifted out from the cylinder, in which way, after the cylinder has been turned to bring the acid-vessel in an inverted position, the receiving end of pipe K, provided with a strainer, will be at the lowest point within the cylinder, and thereby allow a complete discharge of the contents of the latter. The pipe K is held in connection with the cylinder by means of a nut or collar, K', fitted upon a screw-threaded portion of the pipe, and bolted against the inner side of the cylinder-head.

As a means for forming a tight joint at the end of the hollow journal which turns upon the stationary pipe I, the journal is externally screw-threaded at its outer end, and a hand-cap, $I^2$, fitted thereon and adapted to be screwed up, so that while turning with the journal it shall serve as a packing at the end of the same. This hand-cap or adjustable stuffing-box contains some suitable wadding or packing, is fitted to turn upon the pipe I, and has a portion of its base enlarged and screw-threaded, so as to fit upon the journal of the cylinder, and also so as to provide an internal annular shoulder, which, when the cap is screwed upon the journal, brings the inclosed washer or packing up against the end of the latter. The pipe I, which can thus connect at its ends with the cylinders at either end of the latter, runs along opposite sides of the pair of cylinders, and crosses the same at a point back of the reel. This pipe is composed of any desired number of sections connected together by suitable joints or couplings, and is at one side of the apparatus connected with an inclined pipe, L, running up to and connected with the hollow axle of the reel. The pipe I is provided with cocks $I^3$, respectively located between its point of connection with the pipe L, leading to the hose-reel, and its ends connecting with the cylinders, in which way a stream can be turned on from either cylinder. The pipe I is also provided, at a point between its connections with the cylinders, with a cock or nozzle, $I^4$, Fig. 2, closed by some suitable cap, $I^5$, provided with radial handles and screwed upon the nozzle, in which way, should the reel with which the hose is usually connected become damaged, or connection between pipe I and the reel become broken, the hose can be detached from the reel and coupled directly with the nozzle I⁴, which, under the arrangement shown, is at the rear portion of the apparatus and within reach of an attendant upon the rear low-down step.

In order to blow off or exhaust the cylinders, the pipe I is also provided with a pair of waste-cocks, I⁶, located at points between the cylinders and the valve-cocks I³, in which way, by closing the latter, connection can be cut off between the cylinders and the hose, and the cylinders then exhausted by opening the exhaust-cocks.

The pipe L, leading to the reel, is provided with a valve-cock, L′, which can be closed in case the reel should become injured, or in case it is desired to apply the hose to the nozzle I⁴. The pipe L rises from its point of connection with the pipe I, and is bent laterally at its upper end, in order to connect with the hollow axle G′ of the reel. The connection between this pipe and the reel-axle is similar to that between pipe I and either cylinder, and hence will be readily understood from the external view thereof in Fig. 4, in which it will be understood the pipe L enters a prolongation or journal end of the hollow reel-axle, which latter is externally screw-threaded at its end, so as to carry a hand-cap, G², constructed and applied like the caps I², so as to provide a tight joint between the rotary axle and the stationary pipe L.

The bearings G⁵ for the reel-axle are supported upon the inclined standards G⁴, which are arranged in pairs and mounted upon the sides of A⁵ of the body-frame. The reel is supported so that it can be reached by an attendant upon the rear step, and the hose G⁵ is attached to the axle of the reel, which axle is provided with a suitable nozzle, by which it can be connected with the hose, and is also made hollow between the nozzle and its point of connection with the pipe-connection leading to the cylinder.

The reel is constructed in any approved way, and is preferably provided with spring-seated cross-bars G⁶, arranged upon the end spokes of the reel, and thereby providing a spring-cushioned frame, upon which the hose can be wound.

The brake-shoes M, for the rear wheels of the carriage, are operated from a point in front of the driver's seat through the medium of a brake mechanism, arranged as follows: The brake-shoes are carried by a horizontal rod or bar, M′, arranged below and transversely with relation to the cylinders. This cross-bar M′, carrying the brake-shoes, is suspended from the lower end of a vibratory lever, N, which, through the medium of some suitable connecting mechanism, is operated from a foot-lever, N′, in front of the driver's seat.

The vibratory lever carrying the brake-shoe bar is fulcrumed from the rear axle through the medium of a rod, N², connected at one end with the axle, and at its opposite end supporting the vibratory lever, which is pivotally connected with the rod, so as to be susceptible of the requisite vibration.

The rear axle, O, is of a double-crank form, or bent down between its ends, so as to allow space for the cylinder and bring it in position for the fulcrum-rod N², which is pivotally connected with the axle through the medium of some suitable loop-yoke—such, for example, as a pair of blocks, N³, held and clamped upon the axle by a plate, N⁴, (see Fig. 12,) fitted upon screw-threaded ends of a yoke-strap, N⁵, passing around the blocks—in which case a binding force is exerted upon the blocks by nuts fitted upon the strap and tightened against the plate, which latter is provided with a pair of ears, between which the lower end of rod N² is pivoted.

The vibratory bar N is pivoted at its lower end to an arm, M², extending rearwardly from and rigid with the brake-shoe bar M′, which arm M² is braced by a couple of brace-rods, M³, connecting the outer end of the arm with the brake-shoe bar at points near the ends of the latter.

In order to steady the brake-shoes and prevent any sagging of their supporting-bar at either end, the latter is connected at its ends with swinging rods M⁴, which are suspended from the sides of the body-frame of the carriage. The vibratory brake-lever, being thus fulcrumed from the axle, is consequently independent of and will not be affected by the compressions of the springs, and hence the brake-shoes will not be affected by the jolting of the carriage, and can at any time be brought properly against the wheels. The connection between the brake-lever N and the bent lever N′ can consist, simply, of a bell-crank lever, P, pivoted to the body-frame below the seat and connected with the brake-lever by a connecting-rod, P′, and with the foot-lever N′ by a rod, P², which said brake-lever is arranged to work through an opening in the foot-board in front of the seat, and pivoted at one of its angles to the body-frame.

A ladder, Q, is conveniently supported at each side of the apparatus by means of the metal straps or bracket-plates S, (see Fig. 9,) secured to the vertical sides of a pair of supports, T, which rise from the sides A⁵ of the carriage-body and arch over the same. The ladders rest upon rollers S′, arranged in the lower portions of the spaces formed between the brackets and the sides of the arched supports, in which way the ladders can be easily pushed forward into place or drawn back from their position between the brackets and the arched supports, which said position they will occupy when not in use.

The "hook" U, usually the companion of ladders employed in connection with fire-extinguishing apparatus, is conveniently supported by forks or stirrups U′, secured upon the brackets S at one side of the apparatus.

The extreme simplicity of the frame-work of the carriage will be apparent. Thus the sides of the carriage comprise two flat metal bars running from end to end of the carriage and appropriately curved at a point just back of the seat to allow space for the front wheels in turning the carriage. These bars are connected by suitable cross-bars, so as to form a rectangular portion of the body-frame, in which the horizontal cylinders are mounted, and are backed or combined with wooden strips or bars at the sides of such portion of the frame. At a point between the latter and the seat-support the bars are somewhat contracted or converged toward each other, as in Fig. 2, and at their rear ends they are preferably made integral with vertical standards W, supporting at their lower ends the rear low-down step and at their upper end carrying elevated holders W' for torches. The rear step is further supported by inclined braces W², secured at their lower ends to the step and at their upper ends formed integral with the standards W. A suitable gong is arranged in front of the driver's seat, and sounded by a clapper operated by a suitable foot-lever, and one or more lanterns are conveniently hung upon some portion of the frame work of the apparatus.

It will be seen that the cylinders can be filled by an attendant standing upon the rear step, and also that while standing upon the said step the attendant can place the acid-vessels in the cylinders, turn the same so as to invert the acid-vessels, unreel the hose, and open the required cocks, thereby saving time and dispensing with the expense of a multiplicity of attendants.

Obviously a single cylinder fire-extinguishing apparatus could be constructed upon the same principle, it being seen that the feature of a horizontal rotary cylinder admits of a readier manipulation of the apparatus than where a tilting cylinder is normally held in a vertical position.

It will also be observed that under the present arrangement of pipe-connection between the hose-reel and the cylinders communication between the hose and either cylinder can at any time be established by simply turning a cock, whereby the necessity of flexible-pipe connection, or of means by which the hose is to be connected after a cylinder has been tilted, as has heretofore been commonly practiced where tilting cylinders are employed, is entirely avoided.

In the double-cylinder engine herein shown pipe-connection is arranged between the reel and the forward ends of the cylinders; but the connection can, in place of such arrangement, be made with the rear ends of the cylinders, whether a single or double fire-extinguishing apparatus, it being seen that the result will be the same, whether the hollow journal is at the front or the rear end of a cylinder, and that when made at the rear end of the latter the pipe can be bent round, so as to leave ample space for the hand-wheel, by which the cylinder is conveniently turned.

While the herein-described improvements are especially applicable to a fire-extinguishing apparatus carried by a wheeled carriage, yet they are obviously applicable to a stationary frame or support, the cylinders being in either case more available, and the apparatus rendered more compact and serviceable.

It will also be seen that the improvements are applicable to either a single or double-cylinder apparatus. The cylinders are of any suitable construction. As herein shown, each cylinder is formed of two shells, or the cylinder inclosed by a cylindrical casing, which for convenience has been designated as a part of the cylinder.

Having described my invention, what I claim, and desire to secure by Letters Patent, is—

1. In a chemical fire-extinguishing apparatus, one or more horizontally-arranged mixing-cylinders constructed to discharge at one end, in combination with a pivotal bearing for the same, whereby said cylinder or cylinders are susceptible of an axial rotation to admit of inversion and mixture of the chemicals, substantially as described.

2. In a chemical fire-extinguishing apparatus, one or more horizontal rotary mixing-cylinders constructed to discharge at one end, and provided with a side port or opening through which an acid-vessel can be introduced within the cylinder, substantially as and for the purpose described.

3. In a chemical fire-extinguishing apparatus, a horizontal rotary mixing-cylinder constructed to discharge at one end, and at a point near its opposite end provided with an opening through which an acid-vessel can be introduced, substantially as described.

4. In a chemical fire-extinguishing apparatus, a horizontal rotary mixing-cylinder constructed to discharge at one end, and provided with a side opening for the introduction and removal of an acid-vessel, in combination with a seating adapted to support an acid-vessel within the cylinder at right angles to the axis of the latter, substantially as described.

5. In a chemical fire-extinguishing apparatus, a horizontal rotary mixing-cylinder adapted to discharge at one end, in combination with an acid-vessel confined within the cylinder in position at right angles to the axis of the latter, substantially as described.

6. In a chemical fire-extinguishing apparatus, one or more horizontal rotary mixing-cylinders journaled at their ends, in combination with a locking device whereby the cylinders can be temporarily held against rotation, substantially as described.

7. In a chemical fire-extinguishing apparatus, the carriage provided with a step at the rear, in combination with one or more horizontally-arranged mixing-cylinders journaled at their ends in the body-frame of the carriage, each cylinder being connected at one end with some suitable pipe-connection, and at a point near one end being constructed to receive an acid-vessel, substantially as and for the purpose described.

8. In a fire-extinguishing apparatus, one or more horizontal rotary cylinders journaled at their ends upon a carriage, and having the journals at one end made hollow, in combination with pipes connecting and passing through the said hollow journals and connecting the cylinders with a hose-pipe, substantially as described.

9. In a chemical fire-extinguishing apparatus, the rotary mixing-cylinder B, provided at one end with a hollow journal, in combination with a pipe passing through the hollow journal into the cylinder, and a hand-cap fitted to turn upon the pipe and screwed upon the journal, so as to turn with the latter, and at the same time serve as a packing at the joint between the pipe and the journal, substantially as described.

10. In a chemical fire-extinguishing apparatus, the horizontal rotary mixing-cylinder provided at one end with a hollow journal, in combination with two pipes communicating with each other within the journal, one of said pipes being rigid with the frame of the apparatus and the other being connected with the cylinder and extended back within the latter, substantially as described.

11. In a chemical fire-extinguishing apparatus, the horizontal rotary mixing-cylinder mounted upon a frame or carriage, in combination with the pipe-connection I, leading from an end of the cylinder and connected with the hollow axle of a hose-reel mounted above the cylinders, substantially as described.

12. In a chemical fire-extinguisher, the horizontal rotary mixing-cylinders, in combination with pipe I, provided with cocks $I^6$, and connected at its ends with ends of the cylinders, and a pipe, L, through which said pipe is connected at a point between its cocks with the hose, substantially as described.

13. In a chemical fire-extinguisher, the horizontal rotary mixing-cylinders, in combination with a pipe-connection between an end of each cylinder and the hollow axle of a hose-reel supported above the cylinder, said pipe-connection being provided with cocks, arranged substantially as described, whereby either cylinder can be placed in communication with the reel-axle or communication closed between the reel-axle and the cylinders, and a discharge effected directly from the pipe-connection at a point between the two cylinders, substantially as described.

14. In a chemical fire-extinguisher, the horizontal rotary mixing-cylinders, in combination with a pipe-connection, substantially as described, between one end of each cylinder and a hollow member of a hose-reel mounted over the cylinders, said pipe-connection being provided with cocks $I^3$, $I^6$, and $L'$, and with a nozzle, $I^4$, to which a hose can be connected, when desired, substantially as described.

15. In a chemical fire-extinguishing apparatus, one or more horizontal rotary mixing-cylinders provided upon their rear end with journals, with hand-wheels located at the rear of a carriage upon which the cylinders are mounted, substantially as described.

16. In a chemical fire-extinguishing apparatus, the horizontal rotary mixing-cylinder having at one end a pipe-connection, in combination with a perforated seating, $D'$, secured in an opening near one end of the cylinder and extending within the latter, and a cap for closing said opening, substantially as described.

17. In a chemical fire-extinguishing apparatus, the horizontal rotary mixing-cylinder, in combination with the locking-arm E, pivoted to the frame of a carriage supporting the cylinder, and a locking-pin by which said arm can be connnected with some part of the cylinder, substantially as described.

ERNST F. STECK.

Witnesses:
W. W. ELLIOTT,
CHAS. G. PAGE.